(No Model.) 7 Sheets—Sheet 1.

T. J. HOWE, D. J. AMES & H. N. LABARE.
COMBINED CHURN AND BUTTER WORKER.

No. 597,905. Patented Jan. 25, 1898.

Fig. 1.

Witnesses:
C. E. Van Dorn
M. E. Gooley

Inventors:
Thomas J. Howe,
David J. Ames,
Henry N. Labare,
By Paul & Hawley
their att'ys (No Model.)

T. J. HOWE, D. J. AMES & H. N. LABARE.
COMBINED CHURN AND BUTTER WORKER.

No. 597,905.

Patented Jan. 25, 1898.

Fig. 2.

Witnesses;
C. Ed. Van Doren
M. E. Gooley.

Inventors;
Thomas J. Howe.
David J. Ames.
Henry N. Labare
By Paul & Hawley their att'ys (No Model.) 7 Sheets—Sheet 3.

T. J. HOWE, D. J. AMES & H. N. LABARE.
COMBINED CHURN AND BUTTER WORKER.

No. 597,905. Patented Jan. 25, 1898.

Witnesses:
C. E. Van Doren
M. E. Gooley

Inventors:
Thomas J. Howe,
David J. Ames,
Henry N. Labare
By Paul H. Hawley
their attorneys (No Model.) 7 Sheets—Sheet 4.

T. J. HOWE, D. J. AMES & H. N. LABARE.
COMBINED CHURN AND BUTTER WORKER.

No. 597,905. Patented Jan. 25, 1898.

Witnesses;
C. E. Van Doren
M. E. Gooley

Inventors;
Thomas J. Howe,
David J. Ames,
Henry N. Labare.
By Paul & Hawley
their attorneys

(No Model.) 7 Sheets—Sheet 5.

T. J. HOWE, D. J. AMES & H. N. LABARE.
COMBINED CHURN AND BUTTER WORKER.

No. 597,905. Patented Jan. 25, 1898.

(No Model.) 7 Sheets—Sheet 6.

T. J. HOWE, D. J. AMES & H. N. LABARE.
COMBINED CHURN AND BUTTER WORKER.

No. 597,905. Patented Jan. 25, 1898.

Witnesses:
C. E. Van Doren
M. E. Gosley

Inventors;
Thomas J. Howe,
David J. Ames,
Henry N. Labare.
By Paul & Hawley
their attorneys.

(No Model.) 7 Sheets—Sheet 7.

T. J. HOWE, D. J. AMES & H. N. LABARE.
COMBINED CHURN AND BUTTER WORKER.

No. 597,905. Patented Jan. 25, 1898.

Witnesses:
C. E. Van Dorn
J. W. C. Gooley

Inventors,
Thomas J. Howe,
David J. Ames,
Henry N. Labare,
By Paul & Hawley
their attorneys.

UNITED STATES PATENT OFFICE.

THOMAS J. HOWE, DAVID J. AMES, AND HENRY N. LABARE, OF OWATONNA, MINNESOTA.

COMBINED CHURN AND BUTTER-WORKER.

SPECIFICATION forming part of Letters Patent No. 597,905, dated January 25, 1898.

Application filed January 8, 1897. Serial No. 618,440. (No model.)

*To all whom it may concern:*

Be it known that we, THOMAS J. HOWE, DAVID J. AMES, and HENRY N. LABARE, of Owatonna, in the county of Steele and State of Minnesota, have invented certain new and useful Improvements in a Combined Churn and Butter-Worker, of which the following is a specification.

Our improvements relate to a combined churn and butter-worker consisting generally of a drum revolving in suitable bearings, wherein the cream is first churned and the butter then worked before being removed from the drum and in which the internal or butter-working parts may be made to revolve with the drum, or the same parts may be made to remain stationary while the drum revolves around them.

Our invention consists generally in the construction and combination hereinafter described, and particularly pointed out in the claims.

In the accompanying drawings, forming a part of this specification.

In the drawings, 1 represents the outer shell of the drum, 2 the heads thereof, and 3 and 4 suitable spiders attached to the heads of the drum and provided with suitable hubs that are bored out longitudinally and that form journals upon which the drum revolves.

5 is a loose subhead preferably formed of an inner plate or disk of wood and an outer plate or disk of metal.

The journals 11 11 of the butter-working rollers 12 12 pass through the subheads 5 and are supported in said subheads and in the cross-head 37. The cross-head 37 is secured to a shaft 6, that is fitted in the longitudinal hole in the center of the journal of the spider 3. The shaft 6 has a longitudinal motion and may be made to revolve with the drum or remain stationary at will, and the cross-head 37, being rigidly attached to the shaft 6, moves with it. The roller-journals 11 11 pass through the cross-head 37, which may be made to slide longitudinally of said journals. These journals 11 11 have pins 57 57 through their outer ends, and pinions 10 10 are keyed to journals 11 11 at a distance from the ends of said journals to allow of the movement of the cross-head 37 on said journals between the pins 57 and the pinions 10. Pinions 41 and 56 are journaled on stud-pins 62 and 63 on the cross-head and move with said cross-head, and said pinions are also free to turn each on its own axis.

External and internal ring-gears 8 and 9 are bolted to the head of the drum. The pinion 41 may engage with the internal ring-gear 9, and always engages with the pinion 56 and with one of the pinions 10. The other pinion 10 engages with the pinion 56, and through these pinions 10 10, 56, and 41 motion is imparted to the butter-working rollers 12 12 under certain conditions, which will be stated hereinafter. The pinions 10 10 are of greater thickness or wider face than the pinions 41 and 56, so that when the pinion 41 is withdrawn from engagement with the internal ring-gear 9 the pinions 41 and 56 remain in partial engagement with the pinions 10 10, thus keeping the rollers 12 12 always in the same relative position to each other.

Figure 4:
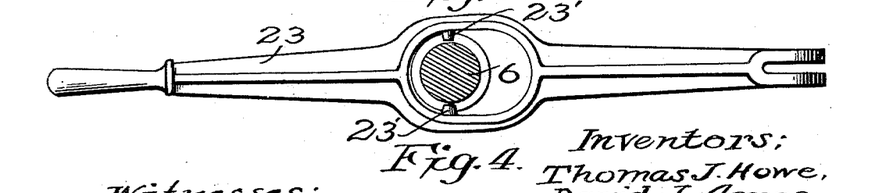
Fig. 4 is a detail of the hand-lever by which the longitudinally-sliding shaft is moved.
Figure 5:
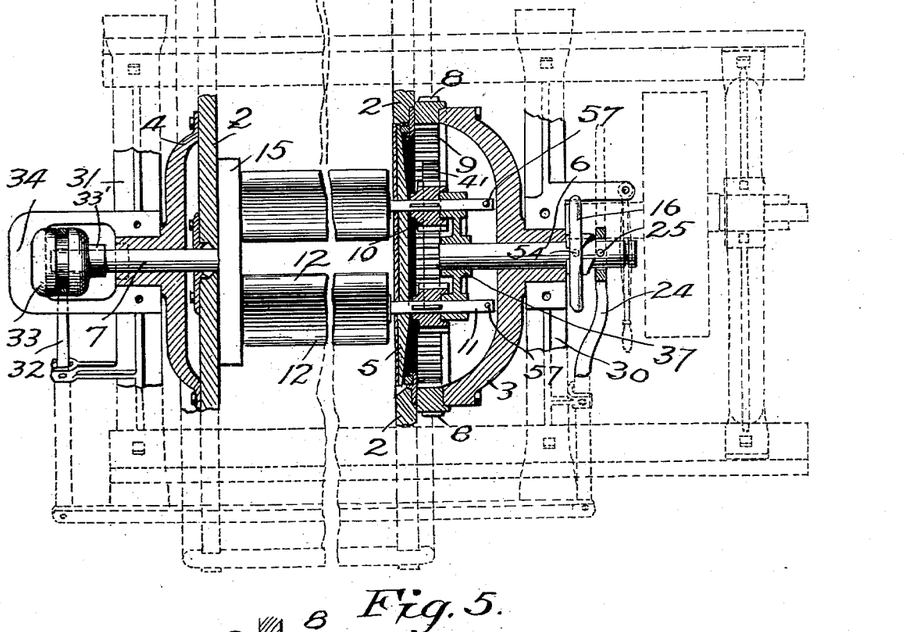
Fig. 5 is a horizontal section similar to Fig. 2, showing the parts in position for working the butter, the frame of the machine, the drum, and some of the operating parts being shown in dotted lines.
Figure 6:
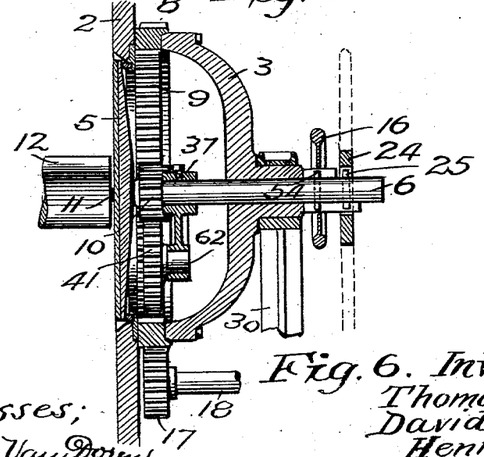
Fig. 6 is a detail section taken on a plane at right angles to that of Fig. 5.
Figures 7, 12, 13, 14, 15, 16, 17:
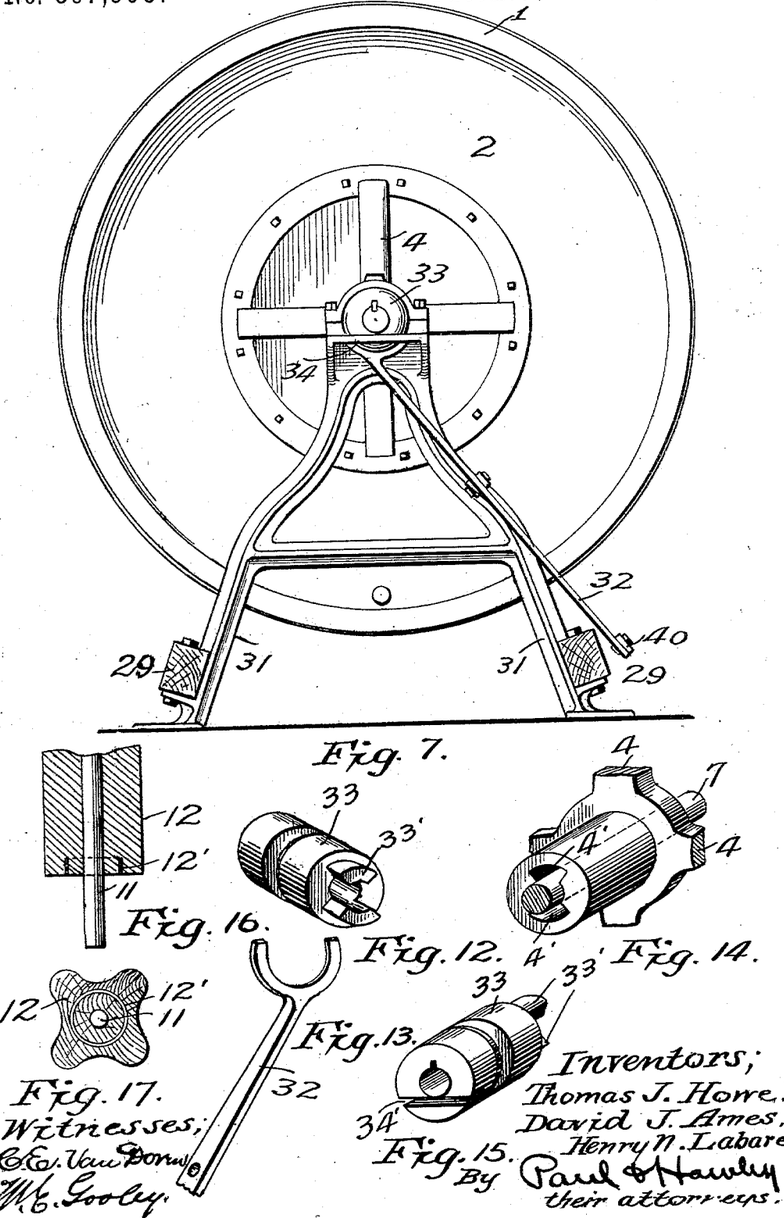
Fig. 7 is an elevation of the end of the machine opposite to that shown in Fig. 3.
Figs. 12, 13, 14, 15, 16, 17, 18, 19, 20, and 21 are details of portions of the mechanism.
Figure 8:
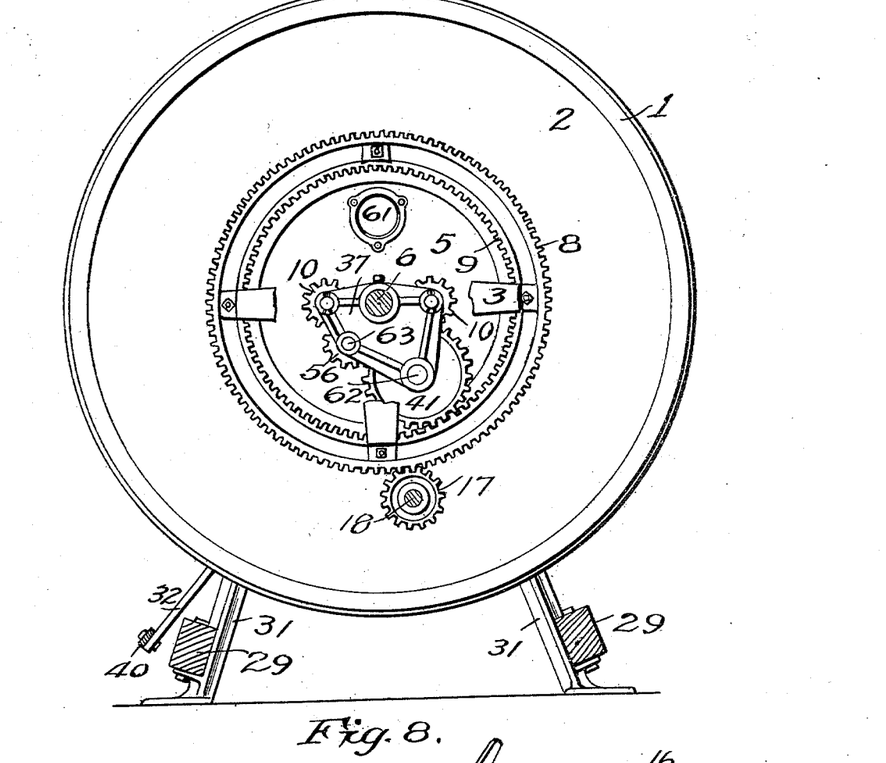
Fig. 8 is an end elevation of the end of the drum shown in Fig. 3, the parts being broken away to show the arrangement of the cross-head and gearing.

The shaft 6 has two pins 54 and 25, as shown in Figs. 1, 2, 5, 6, and 19. Instead of these two pins a single pin of sufficient width or any suitable projection on the shaft 6 will serve the same purpose. Between the pin 54 and the end of the hub or journal of the spider 3 is a clamp-wheel 16. (See Figs. 1, 2, 5, 6, 18, 19, and 20.) The face of the clamp-wheel 16 that is toward the pin 54 is in the form of a cam 16', so that when said clamp-wheel is partially revolved around the shaft 6, between the end of the journal of the spider 3 and the pin 54, said pin will be forced away from the journal, sliding the shaft 6 in its bearings and carrying the cross-head 37 with it. When the cross-head 37 is brought in contact with the pins 57 57, the ends of the rollers 12 12 will be made to press against the loose or sub head 5, and that in turn will be forced against the cork or other suitable packing 39' in the groove 39 of the packing-ring 38, thereby making a tight joint both around the journals 11 11 and the subhead 5 to prevent the contents of the drum from leaking out while churning. The clamp-wheel 16 has a groove 58, into which the pin 54 may slip loosely when the subhead 5 is loosened. A lever 23 is pivoted at its end upon the frame of the machine and is provided with pins or projections 23', (see Figs. 4 and 5,) that engage a groove in the shaft 6. This lever does not interfere with the revolution of the shaft 6, and by means of said lever the shaft 6 may be moved longitudinally, thereby moving the pinion 41 out of and into engagement with the internal ring-gear 9.

At the opposite end of the drum and fitting revolubly in the hub or journal of the spider 4 is a shaft 7, to which is attached a subhead 15, and in this subhead the journals 64 64 of the rollers 12 12 are supported and revolve.

A clutch-hub 33 is fitted to and is capable of moving longitudinally on the shaft 7; but said hub is caused to revolve with said shaft by any suitable means—such, for example, as the spline or key 35. The clutch-hub 33 has projections 33' on its end next the hub of the spider 4, and in the hub of said spider are corresponding recesses 4', so that when said projections are brought into engagement with said recesses the hub 33, the shaft 7, and the subhead carried by said shaft rotate with the drum. On the other end of the clutch-hub 33 we provide a slot or recess 34', adapted to engage a projecting portion 34 of the frame of the machine. When the hub 33 is moved away from the hub of the spider 4 and is brought into engagement with the portion 34 of the frame, said hub, the shaft 7, and the subhead carried by said shaft are held stationary, while the drum revolves. A suitable stuffing-box 36 may be provided for forming a close joint around the shaft 7. The subhead 15 is preferably formed of a suitable casting 15', that is secured to the end of the shaft 7 and forms the bearings for the journal of the butter-working rolls and a suitable wooden plate 15'', that is secured and practically covers said casting, so as to prevent the contents of the churn from coming in contact therewith. We do not, however, limit ourselves to any particular construction of either the subhead 15 or the subhead 5.

Figure 1:
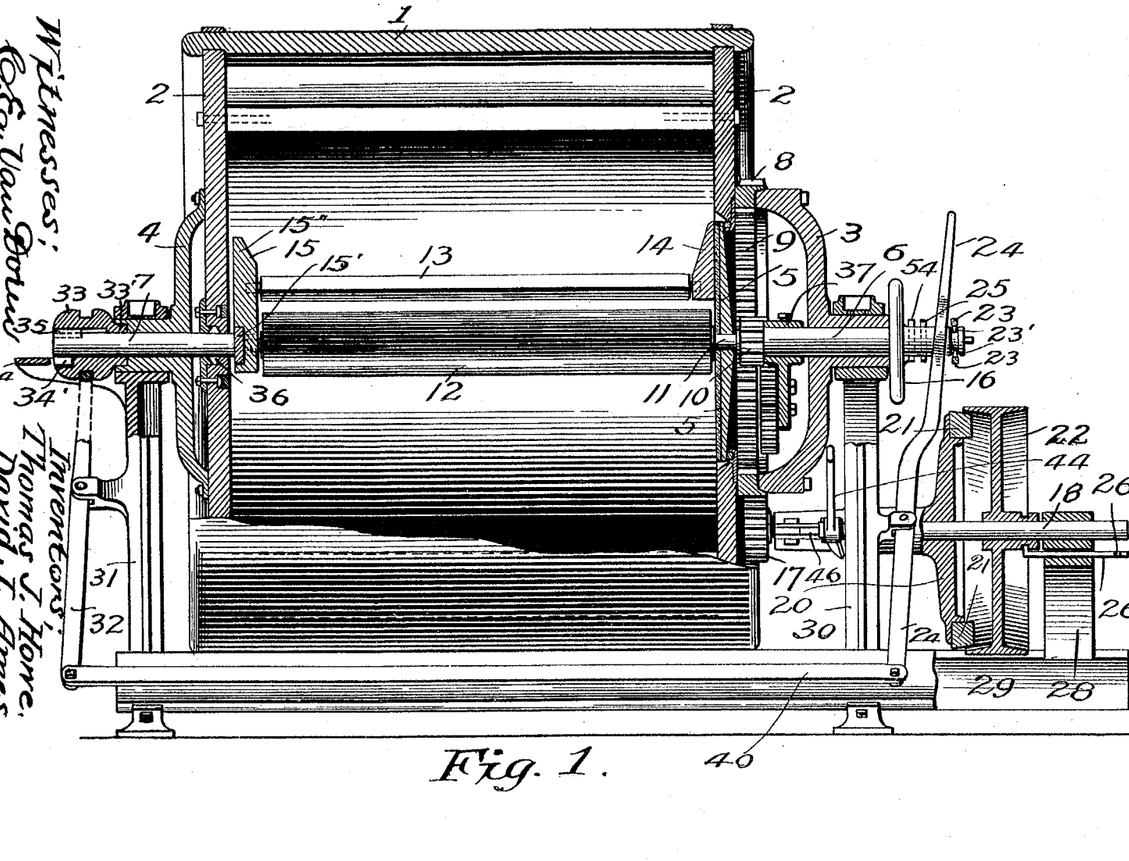
Figure 1 is a side elevation and partial section of a machine embodying our invention.
Figure 2:
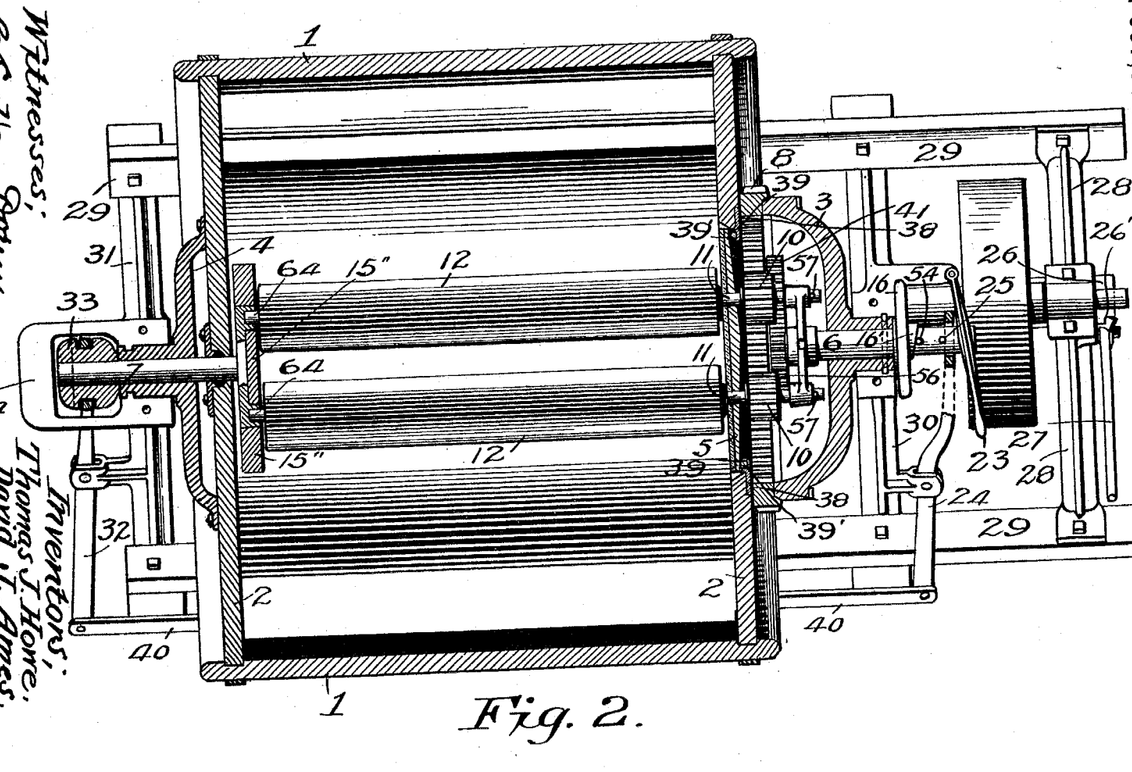
Fig. 2 is a substantially central horizontal section.
Figure 3:
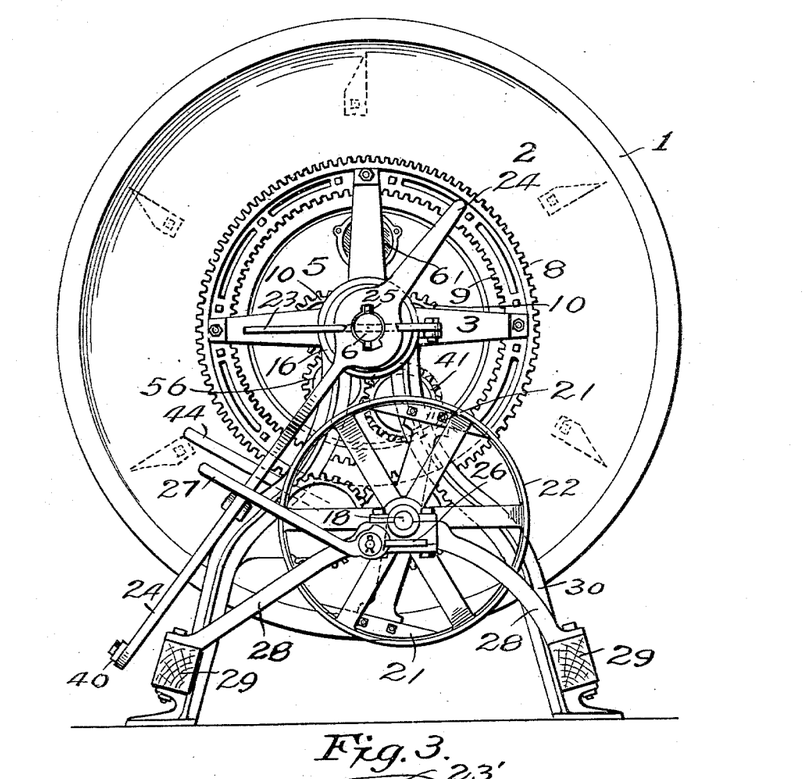
Fig. 3 is an end elevation.

A lever 24 (shown in full lines in Figs. 1, 2, and 3 and partially in dotted lines in Figs. 5 and 6 and in detail in Fig. 19) has an opening 60 through it to fit over the end of the shaft 6 and the pins 54 and 25 upon said shaft. The opening 60 in said lever also receives the projection 59 on the clamp-wheel 16 when said clamp-wheel is in a certain position. The opening 60 in said lever has a circular central portion, with narrow notches or recesses extending therefrom, as shown clearly in Figs. 19 and 21, so that when the lever 24 is thrown toward the end of the drum and over the pins 54 and 25 and over the projection 59 on the clamp-wheel 16 the shaft 6 is locked and cannot revolve. To the lower end of the lever 24 is attached a rod 40, which connects with the lower end of a lever 32, whose upper end is in the form of a fork and engages a groove in the clutch-hub 33. (See Figs. 1, 2, 12, 13, and 15.) When the clamp-wheel 16 is loosened, the projections 59 on said wheel come against the pins 54 and 25 and in position to enter the opening 60 in the lever 24 with said pins 54 and 25. (See Figs. 3 and 21.) When the clamp-wheel 16 is in position to tighten the loose subhead 5, the projection 59 on said clamp-wheel 16 does not come opposite the notches or recesses forming part of the opening 60 in the lever 24, so that said lever cannot then be pushed toward the head of the drum or over the pins 54 and 25, as said lever will then strike against the end of the projection 59.

The machine is provided with a suitable frame, and 28, 30, and 31 are the legs of the frame which supports the drum. These legs are connected by a suitable cross-piece or girth 29. The levers 24 and 32, hereinbefore described, are fulcrumed, preferably, on the legs of the supporting-frame. We also prefer to provide the drum with the loose shelves or rollers 13 13, supported in the subhead 15 and in a projection 14 upon the subhead 5, said shelves or rollers being arranged a little above and outward of the butter-working rolls.

A suitable shaft 18 is mounted in bearings on the frame of the machine, said shaft being provided with a pinion 17, that meshes with the external ring-gear 8 upon the end of the drum. A pulley 22 is fitted upon the shaft 18 and revolves easily thereon and is capable of moving longitudinally on said shaft. A suitable clutch 20 is arranged upon the shaft 18 and revolves freely thereon, but is prevented from moving longitudinally by a projection 50 on the supporting-frame that engages a groove in the hub of said clutch. Said clutch is provided with the curved wooden blocks 21 21, suitably secured to it, so that when the driving-pulley 22 is moved into such position that its rim comes over said blocks the friction between said pulley and said blocks will cause the clutch to revolve with the pulley. Secured to or formed integrally with the hub of said clutch is a suitable pinion 49, which engages with a larger pinion 48, mounted upon a stationary shaft 45.

Figures 9, 10, 11:
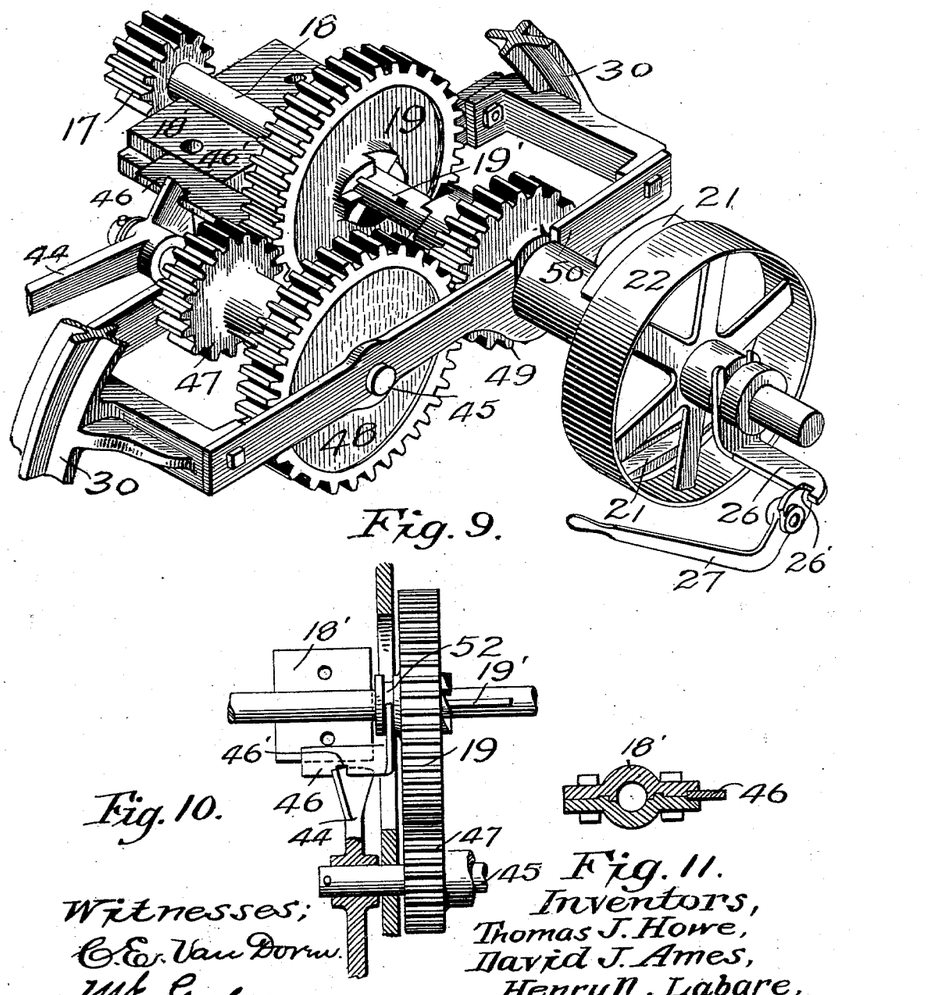
Fig. 9 is a perspective view showing the driving-pulleys and the gear for driving the drum.
Fig. 10 is a detail part of the gearing shown in Fig. 9.
Fig. 11 is a detail showing the shaft-supporting box and the slide connected therewith.
Figures 18, 19, 20, 21:
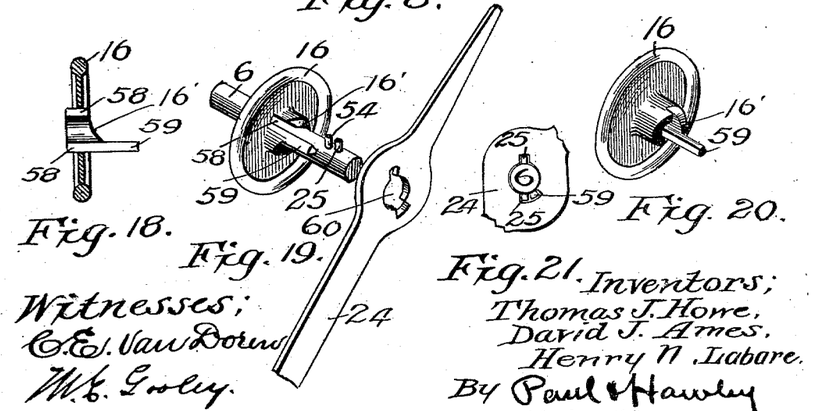

A pinion 19 on the shaft 18 is of larger diameter than the pinion 47, and may be made to engage with said pinion 47 or be disengaged therefrom at will. The pinion 19 is secured to the shaft 18 by a suitable spline or key 19', (see Figs. 9 and 10,) so that said pinion 19 while it always revolves with the shaft 18 is capable of a longitudinal motion on said shaft. The hub of the clutch 20 and the hub of the pinion 19 have interlocking clutch projections on their contiguous ends. A groove 52 in the hub of the pinion 19 receives the forked part of a suitable slide 46, said slide being supported in a suitable groove or way in the bearing 18' of the shaft 18. (See Figs. 9, 10, and 11.) A lever 44 is pivoted upon the end of the shaft 45, and the short end of said lever is preferably flattened and stands diagonally to the plane of the motion of the lever. This end of the lever engages a notch 46' in the edge of the slide 46, so that a movement of said lever causes the slide 46 to move, carrying the pinion 19 with it, said pinion 19 being thereby moved out of engagement with the pinion 47 and into engagement with the clutch 20, or vice versa, at will.

A slide 26 is provided with a forked end that engages a groove in the hub of the pulley 22. Said slide is suitably supported in the frame of the machine, and a lever 27 is pivoted upon the frame of the machine and is provided with a flattened and diagonally-arranged end that engages a notch 26' in said slide 26.

The operation of the machine will be readily understood from the foregoing detailed description of the mechanism. When it is desired to use the machine for churning, the drum is turned right side up. The lever 24 is then pulled away from the head of the drum, thereby through the lever 32 and the clutch-hub 33 locking the shaft 7 and the subhead carried by it to the drum of the machine. The loose or sub head 5 is then tightened by means of the clamp-wheel 16, which is turned so as to cause the cam-face to bear against the pin 54, thus locking the shaft 6 and the cross-head carried by it to the spider 3 and the drum of the machine. As the subhead 5 is drawn tightly against the main head of the drum a tight joint, as before stated, will be formed around said subhead and also around the journals 11, as stated. The butter-working rollers and all of the internal parts of the machine will then revolve with the drum. After the cream is put into the churn and the door (not shown) closed the lever 44 is moved until the pinion 19 is brought into engagement with the clutch 20. This will give the churn the fast motion desired for churning. To start the churn, the lever 27 is turned so as to move the pulley 22 into contact with the friction-blocks on the clutch 20, the lever 27 being thrown back into the position shown in Fig. 9. The weight of said lever will generally be sufficient to hold the pulley in engagement with the friction-blocks of the clutch with sufficient force to drive the machine. When the churning is finished, the lever 27 is turned so as to move the pulley 22 out of engagement with the clutch 20. The drum is then turned right side up and the clamp-wheel 16 loosened, thereby loosening the subhead 5. The lever 24 is pushed toward the head of the drum, the opening 60 in said lever passing over the pins 54 and 25 in the shaft 6 and over the projection 59 on the clamp-wheel 16, and through the rod 40 and lever 32 the clutch-hub 33 will be made to engage with the projection 34 on the frame of the machine. The shafts 6 and 7, the cross-head 37, and the subheads 15 and 5 and the parts supported by them will now be prevented from rotating with the drum. The lever 44 is then moved so as to throw the pinion 19 into engagement with the pinion 47, through which a slow motion may be imparted to the drum. The lever 23 is then moved toward the head of the drum, sliding the shaft 6 in its bearings and moving the pinion 41 into engagement with the internal ring-gear 9. The churn is then started by means of the lever 29, and the flights or shelves in the drum will bring the butter up and deposit it on top of the rollers 12 12, which by their motion will work the butter down between them ready for the operation to be repeated as often as necessary. When the butter is worked sufficiently, the motion of the rollers is stopped by pulling the lever 23 away from the head of the drum. The revolutions of the drum will then deposit the butter on top of the rollers ready to be removed. We prefer to use wooden butter-working rollers of substantially the form shown in Fig. 17 of the drawings, and we prefer to embed in the end of each roll surrounding the journal 11 a metallic band 12' to prevent the end of the roll from splitting. (See Figs. 16 and 17.) We also prefer to provide in the subhead 5 a suitable opening covered by a glass 61, through which the operator may look into the drum.

We do not limit ourselves to the details of the construction of the various parts herein shown and described, as the same may obviously be varied in many particulars without departing from our invention.

Having thus described our invention, we claim as new and desire to secure by Letters Patent—

1. In a combined churn and butter-worker, wherein the butter-working parts within the drum may be held stationary or caused to revolve with the drum at will, the combination with the drum, the rolls and roll-supporting devices, of means for simultaneously locking the roll-supporting devices at both ends of the drum to the frame of the machine or releasing the same therefrom.

2. In a combined churn and butter-worker, the combination with the drum, of the butter-working rolls arranged within the drum, subheads supporting said rolls, and connecting means for simultaneously locking both said subheads against rotary movement to the frame of the machine or releasing the same therefrom, for the purpose set forth.

3. In a combined churn and butter-worker, the combination, with the drum, of the butter-working rolls arranged in said drum, subheads in which said rolls are mounted, shafts supporting said subheads, and connecting mechanism for simultaneously locking both of said shafts against rotary movement to the frame of the machine or releasing the same therefrom.

4. In a combined churn and butter-worker, the combination, with the drum, of the rolls, the subheads supporting said rolls, means for simultaneously locking said subheads against rotary movement to the frame of the machine or releasing the same therefrom, or for locking both of said subheads to the drum to rotate therewith.

5. In a combined churn and butter-worker, the combination with the drum provided with hollow journals, of the butter-working rolls, the subheads, the shafts supporting said subheads and passing through the hollow journals of the drum, the locking-levers 24 and 32, and the rod 40 connecting said levers to the frame of the machine or releasing the same therefrom.

6. In a combined churn and butter-worker, the combination, with the drum, of the butter-working rolls arranged in said drum, of means for rotating said drum either at a high or low speed, means for causing said rolls to rotate with said drum, to rotate upon their own axes or to remain stationary, for the purpose set forth.

7. In a combined churn and butter-worker, the combination, with the drum and the butter-working rolls supported therein, of the shaft 6 provided with the pin 54 and means for sliding said shaft, the cross-head carried by said shaft and supporting the journals of the butter-working rolls, and the clamp-wheel 16 arranged upon said shaft and provided with a cam-face, for the purpose set forth.

8. The combination, with the drum, provided with the internal gear-wheel 9, the butter-working rolls arranged in said drum, of the shaft 6, means for sliding the same, the cross-head carried by said shaft and supporting the journals of the butter-working rolls, the pinions carried by said cross-head, one of said pinions being adapted to be moved into or out of engagement with said internal ring-gear 9, the pin 54 upon said shaft, and the clamp-wheel 16 provided with a cam-face, for the purpose set forth.

9. The combination, with the drum provided with the external ring-gear 8, of the shaft 18 provided with the pinion 17 engaging said ring-gear, the clutch 20 provided with the friction-blocks 21 and with the pinion 49, the sliding drive-pulley 22 adapted to engage said friction-blocks, the shaft 45 provided with the pinions 48 and 47, and the pinion 19 upon said shaft 18 connected to said shaft by a suitable spline, the movable slide engaging said pinion and adapted to hold said pinion in engagement with the pinion 47 or with the clutch 20.

10. In a combined churn and butter-worker, the combination, with the drum, of the butter-working rolls supported in said drum, the sliding shaft 6, the cross-head carried by said shaft and supporting the journals of the butter-working rolls, the pins 54 and 25 upon said shaft, the clamp-wheel 16 provided with the cam-surface 16' and with the projection 59, and the lever 24 provided with the opening 60, for the purpose set forth.

In testimony whereof we have hereunto set our hands this 1st day of January, A. D. 1897.

THOMAS J. HOWE.
DAVID J. AMES.
HENRY N. LABARE.

In presence of—
LEWIS L. WHEELOCK,
MYRTLE E. BARNHART.